(12) United States Patent
An et al.

(10) Patent No.: US 8,078,223 B2
(45) Date of Patent: Dec. 13, 2011

(54) MOBILE TERMINAL HAVING EXPANSION MODULE AND METHOD OF CONTROLLING OPERATION OF THE MOBILE TERMINAL

(75) Inventors: Hyuk San An, Seoul (KR); Sang Gyu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 398 days.

(21) Appl. No.: 12/490,812

(22) Filed: Jun. 24, 2009

(65) Prior Publication Data

US 2010/0022277 A1 Jan. 28, 2010

(30) Foreign Application Priority Data

Jul. 25, 2008 (KR) .................. 10-2008-0073068
Aug. 1, 2008 (KR) .................. 10-2008-0075674

(51) Int. Cl.
*H04B 1/38* (2006.01)
*H04K 3/00* (2006.01)
(52) U.S. Cl. .................................. 455/557; 710/2
(58) Field of Classification Search .......... 455/410–411, 455/557–559; 710/1–2
See application file for complete search history.

(56) References Cited

U.S. PATENT DOCUMENTS

2009/0091422 A1* 4/2009 Minoo et al. ............... 340/5.8
2010/0173673 A1* 7/2010 Lydon ....................... 455/557
* cited by examiner

*Primary Examiner* — Lee Nguyen
(74) *Attorney, Agent, or Firm* — Birch, Stewart, Kolasch & Birch, LLP

(57) ABSTRACT

A mobile terminal including a main body configured to provide a communication function, an expansion module configured to provide a number of additional functions to the main body, a connector including at least first, second and third pins and configured to electrically connect the main body and the expansion module together, and a controller configured to determine whether a signal having a first logic level is received via the first pin of the connector, to set up communication between the mobile terminal and the expansion module using only the first pin and a corresponding ground source and a 1-wire communication method on the first pin if the signal received on the first pin has the first logic level, to determine whether or not the expansion module is an authenticated expansion module through the 1-wire communication method on the first pin, and to allow the expansion module to provide the number of additional functions to the main body through serial communication using the second and third pins when the expansion module is determined to be successfully authenticated.

20 Claims, 9 Drawing Sheets

MOBILE TERMINAL HAVING EXPANSION MODULE AND METHOD OF CONTROLLING OPERATION OF THE MOBILE TERMINAL

CROSS-REFERENCE TO A RELATED APPLICATION

The present application claims the priority benefit of Korean Patent Application Nos. 10-2008-0073068 and 10-2007-0075674, filed on Jul. 25, 2008 and Aug. 1, 2008, respectively, in the Korean Intellectual Property Office, the disclosures of which are incorporated herein by reference.

BACKGROUND OF THE INVENTION

1. Field of the Invention

The present invention relates to a mobile terminal and corresponding controlling method, in which an expansion module for providing various additional functions can be connected to the main body of the mobile terminal and can thus be used along with the mobile terminal.

2. Description of the Related Art

Mobile terminals provide users with various services such as a voice calling service, a video calling service, an information input/output service, and a data storage service. Mobile terminals also provide additional services such as allowing the user to capture photos or moving pictures, play music files or moving image files, play game programs, receive and watch broadcast programs and access wireless Internet services. Thus, mobile terminals now function as multimedia players.

Because the mobile terminal includes a variety of different functions, the mobile terminals include various user interface (UI) environments that allow the user to easily search for and choose desired functions. However, because the mobile terminal is small in size, the there is a restriction in the amount of display space available for displaying information.

SUMMARY OF THE INVENTION

Accordingly, one object of the present invention is to address the above-noted and other problems.

Another object of the present invention is provided a mobile terminal and corresponding method in which an expansion module for providing various additional functions can be connected to the main body of the mobile terminal and can thus be used along with the mobile terminal.

To achieve these and other advantages and in accordance with the purpose of the present invention, as embodied and broadly described herein, the present invention provides in one aspect a mobile terminal including a main body configured to provide a communication function, an expansion module configured to provide a number of additional functions to the main body, a connector including at least first, second and third pins and configured to electrically connect the main body and the expansion module together, and a controller configured to determine whether a signal having a first logic level is received via the first pin of the connector, to set up communication between the mobile terminal and the expansion module using only the first pin and a corresponding ground source and a 1-wire communication method on the first pin if the signal received on the first pin has the first logic level, to determine whether or not the expansion module is an authenticated expansion module through the 1-wire communication method on the first pin, and to allow the expansion module to provide the number of additional functions to the main body through serial communication using the second and third pins when the expansion module is determined to be successfully authenticated.

In another aspect, the present invention provides a method of controlling a mobile terminal including a main body configured to provide a communication function, an expansion module configured to provide a number of additional functions to the main body, and a connector including at least first, second and third pins and configured to electrically connect the main body and the expansion module together. The method includes determining whether a signal having a first logic level is received via the first pin of the connector, setting up communication between the mobile terminal and the expansion module using only the first pin and a corresponding ground source and a 1-wire communication method on the first pin if the signal received on the first pin has the first logic level, determining whether or not the expansion module is an authenticated expansion module through the 1-wire communication method on the first pin, and allowing the expansion module to provide the number of additional functions to the main body through serial communication using the second and third pins when the expansion module is determined to be successfully authenticated.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown. In addition, the term 'mobile terminal' described in this specification includes a mobile phone, a smart phone, a laptop computer, a digital broadcast receiver, a personal digital assistant (PDA), a portable multimedia player (PMP), or a navigation device.

Figure 1:
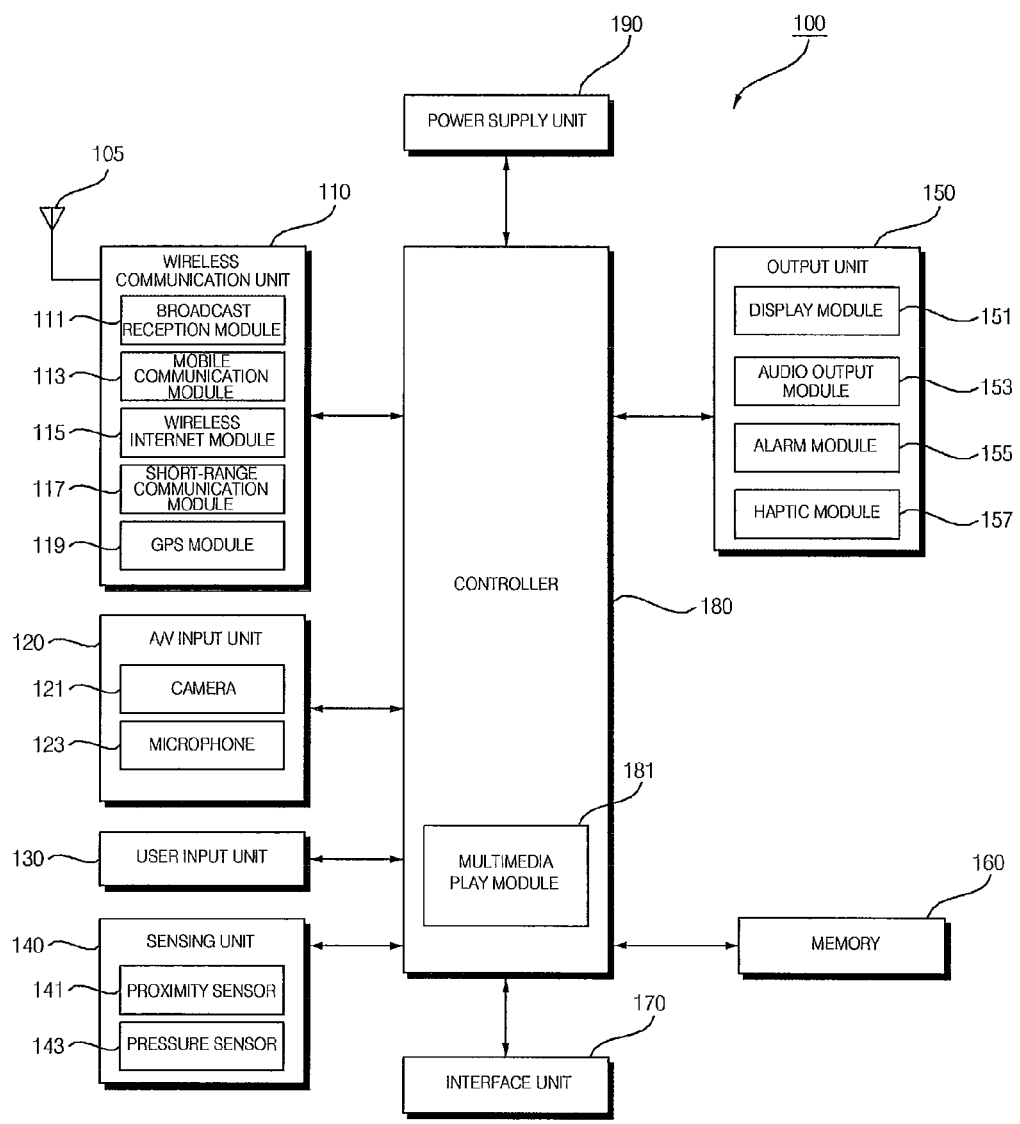
FIG. 1 is a block diagram illustrating a mobile terminal according to an embodiment of the present invention.

In embodiments of the present invention and as shown in FIG. 1, a mobile terminal include a main body 100 and an expansion module 200 which can be connected to or disconnected from the main body 100. The expansion module 200 also provides various functions to the main body 100. In more detail, FIG. 1 is a block diagram illustrating the main body 100 of a mobile terminal according to an embodiment of the present invention. Referring to FIG. 1, the mobile terminal includes a wireless communication unit 110, an audio/video (A/V) input unit 120, a user input unit 130, a sensing unit 140, an output unit 150, a memory 160, an interface unit 170, a controller 180 and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the components may be divided into two or more smaller units.

The wireless communication unit 110 includes a broadcast reception module 111, a mobile communication module 113, a wireless Internet module 115, a short-range communication module 117 and a global positioning system (GPS) module 119. The broadcast reception module 111 receives a broadcast signal and/or broadcast-related information from an external broadcast management server through a broadcast channel. The broadcast channel may be a satellite channel or a terrestrial channel. Further, the broadcast management server may be a server which generates broadcast signals and/or broadcast-related information and transmits the generated broadcast signals and/or the generated broadcast-related information, or may be a server which receives and then transmits previously-generated broadcast signals and/or previously-generated broadcast-related information.

In addition, the broadcast-related information may include broadcast channel information, broadcast program information and/or broadcast service provider information, and the broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the main body 100 through a mobile communication network. In this instance, the broadcast-related information may be received by the mobile communication module 113, rather than by the broadcast reception module 111. The broadcast-related information may also come in various forms. For example, the broadcast-related information may be an electronic program guide (EPG) of the digital multimedia broadcasting (DMB) system or may be an electronic service guide (ESG) of the digital video broadcast-handheld (DVB-H) system.

In addition, the broadcast reception module 111 receives the broadcast signal using various broadcasting systems such as the digital multimedia broadcasting-terrestrial (DMB-T) system, the digital multimedia broadcasting-satellite (DMB-S) system, the media forward link only (MediaFLO) system, the DVB-H system, and the integrated services digital broadcast-terrestrial (ISDB-T) system. In addition, the broadcast reception module 111 may be configured to be suitable for nearly all types of broadcasting systems other than those set forth herein. The broadcast signal and/or the broadcast-related information received by the broadcast reception module 111 may also be stored in the memory 160.

Further, the mobile communication module 113 transmits wireless signals to or receives wireless signals from at least one of a base station, an external terminal, and a server through a mobile communication network. The wireless signals may include various types of data according to whether the mobile terminal shown in FIG. 1 transmits/receives voice call signals, video call signals, or text/multimedia messages. Also, the wireless Internet module 115 corresponds to a module for wirelessly accessing the Internet, and may be embedded in the main body 100 or be installed in an external device. In addition, the wireless Internet module 115 may use various wireless internet techniques such as wireless fidelity (WiFi), wireless broadband (Wibro), world interoperability for microwave access (Wimax) or high-speed downlink Packet Access (HSDPA).

Further, the short-range communication module 117 corresponds to a module for short-range communication. The short-range communication module 117 may use various short-range communication techniques such as Bluetooth, radio frequency identification (RFID), infrared data association (IrDA), ultra wideband (UWB), and ZigBee. Further, the GPS module 119 receives position information from a plurality of GPS satellites, and the A/V input unit 120 is used to receive audio signals or video signals. In FIG. 1, the A/V input unit 120 includes a camera 121 and a microphone 123. The camera 121 processes various image frames such as still images or moving images captured by an image sensor during a video call mode or an image capturing mode. The image frames processed by the camera 121 may also be displayed by a display module 151. In addition, the image frames processed by the camera 121 may be stored in the memory 160 or be transmitted to an external device through the wireless communication unit 110. The mobile terminal shown in FIG. 1 may also include two or more cameras 121.

Further, the microphone 123 receives external sound signals during a call mode, a recording mode, or a voice recognition mode with the use of a microphone and converts the sound signals into electrical sound data. In the call mode, the mobile communication module 113 converts the electrical sound data into data that can be transmitted to a mobile communication base station and then outputs the data obtained by the conversion. The microphone 123 may also use various noise removal algorithms to remove noise generated during the reception of external sound signals.

In addition, the user input unit 130 generates key input data based on user input for controlling the operation of the mobile terminal shown in FIG. 1. The user input unit 130 may be implemented as a keypad, a dome switch, a touch pad (static pressure/static voltage), a jog wheel or a jog switch. In particular, if the user input unit 130 is implemented as a touch pad and forms a layer structure together with the display module 151, the user input unit 130 and the display module 151 may be collectively referred to as a touch screen.

Further, the sensing unit 140 determines a current state of the main body 100 such as whether the main body 100 is opened or closed, the position of the main body 100 and whether the main body 100 is placed in contact with a user, and generates a sensing signal for controlling the operation of the mobile terminal shown in FIG. 1. For example, when the main body 100 is the main body of a slide-type mobile phone, the sensing unit 140 can determine whether the main body 100 is opened or closed. In addition, the sensing unit 140 can determine whether the mobile terminal shown in FIG. 1 is powered by the power supply unit 190 and whether the interface unit 170 is connected to an external device.

In FIG. 1, the sensing unit 140 includes a proximity sensor 141 and a pressure sensor 143. The proximity sensor 141 can determine whether there is an entity nearby and approaching the main body 100 without any mechanical contact with the entity. More specifically, the proximity sensor 141 can detect an entity that is nearby and approaching by detecting a change in an alternating magnetic field or the rate of change of static capacitance. The sensing unit 140 may also include two or more proximity sensors 141. Further, the pressure sensor 143 can determine whether pressure is being applied to the main body 100 and detect the magnitude of pressure applied to the main body 100. The pressure sensor 143 may also be installed in a portion of the main body 100 in which the detection of pressure is necessary. For example, the pressure sensor 143 may be installed in the display module 151. In this instance, the display module 151 may differentiate a typical touch input from a pressure touch input, which is generated by applying greater pressure than that used to generate a typical touch input, based on a signal output by the pressure sensor 143. In addition, it is possible to determine the magnitude of pressure applied to the display module 151 upon receiving a pressure touch input based on the signal output by the pressure sensor 143.

In addition, the output unit 150 can output audio signals, video signals and alarm signals. In FIG. 1, the output unit 150 includes the display module 151, an audio output module 153, an alarm module 155 and a haptic module 157. The display module 151 can display various information processed by the mobile terminal shown in FIG. 1. For example, if the mobile terminal shown in FIG. 1 is in a call mode, the display module 151 can display a user interface (UI) or a graphic user interface (GUI) for making or receiving a call. If the mobile terminal is in a video call mode or an image capturing mode, the display module 151 can display a UI or a GUI for capturing or receiving images. Also, if the display module 151 and the user input unit 130 form a layered structure together and are thus implemented as a touch screen, the display module 151 can be used as both an output device and an input device. If the display module 151 is implemented as a touch screen, the display module 151 may also include a touch screen panel and a touch screen panel controller.

In more detail, the touch screen panel is a transparent panel attached onto the exterior of the main body 100 and is connected to an internal bus of the main body 100. The touch screen panel monitors whether the touch screen panel is being touched by the user, and once a touch input to the touch screen panel is detected, the touch screen panel transmits a number of signals corresponding to the touch input to the touch screen panel controller. The touch screen panel controller then processes the signals transmitted by the touch screen panel, and transmits the processed signals to the controller 180. Then, the controller 180 determines a touch input has been generated and which part of the touch screen panel has been touched based on the processed signals transmitted by the touch screen panel controller.

Further, the display module 151 may include at least one of a liquid crystal display (LCD), a thin film transistor (TFT)-LCD, an organic light-emitting diode (OLED), a flexible display, a three-dimensional (3D) display and a transparent OLED. The mobile terminal shown in FIG. 1 may also include two or more display modules 151. For example, the mobile terminal may include an external display module and an internal display module. In addition, the audio output module 153 outputs audio data received by the wireless communication unit 110 during a call reception mode, a call mode, a recording mode, a voice recognition mode, or a broadcast reception mode or outputs audio data present in the memory 160. In addition, the audio output module 153 can output various sound signals associated with the functions of the mobile terminal shown in FIG. 1 such as receiving a call or a message. The audio output module 153 may also include a speaker and a buzzer.

In addition, the alarm module 155 outputs an alarm signal indicating the occurrence of an event in the mobile terminal. Examples of the event include receiving a call signal, receiving a message, and receiving a key signal, and examples of the alarm signal output by the alarm module 155 include an audio signal, a video signal and a vibration signal. More specifically, the alarm module 155 can output a signal upon receiving a call signal or a message. In addition, the alarm module 155 can receive a key signal and output a signal as feedback to the key signal. Therefore, the user can determine whether an event has occurred based on an alarm signal output by the alarm module 155. An alarm signal for notifying the user of the occurrence of an event can also be output not only by the alarm module 155 but by the display module 151 or the audio output module 153.

Further, the haptic module 157 provides various haptic effects (such as vibrations) that can be perceived by the user. If the haptic module 157 generates vibration as a haptic effect, the intensity and the pattern of vibration generated by the haptic module 157 may be altered in various manners. The haptic module 157 can also synthesize different vibration effects and output the result of the synthesization. Alternatively, the haptic module 157 can sequentially output different vibration effects. The haptic module 157 can also provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 can also be configured to enable the user to recognize a haptic effect using the kinesthetic sense of the fingers or the arms. Two or more haptic modules 157 may also be provided.

In addition, the memory 160 stores various programs used for the operation of the mobile terminal. In addition, the memory 160 can temporarily store various data such as a phonebook, messages, still images, or moving images. The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal shown in FIG. 1 can also operate a web storage on the Internet, which performs the functions of the memory 160.

Further, the interface unit 170 is used to interface with an external device that can be connected to the main body 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may also be a card socket for accommodating a SIM or UIM card or an exterior card such as a memory card for storing information. In addition, the interface unit 170 can receive data from an external device or be powered by an external device, and transmit data provided by an external device to other components in the main body 100 or transmit data provided by other components in the main body 100 to an external device. Also, if the main body 100 is connected to an external cradle, power may be supplied from the external cradle to the mobile terminal through the interface unit 170, and various command signals may be transmitted from the external cradle to the mobile terminal through the interface unit 170.

In addition, the controller 180 controls the overall operations of the mobile terminal shown in FIG. 1. For example, the controller 180 can perform various control operations regarding making/receiving a voice call, transmitting/receiving data, or making/receiving a video call, and in FIG. 1, includes a multimedia play module 181, which plays multimedia data. The multimedia play module 181 may be implemented as a hardware device and may be installed in the controller 180. Alternatively, the multimedia play module 181 may be implemented as a software program. Further, the power supply unit 190 may be supplied with power by an external power source or an internal power source and may supply power to the other components in the main body 100. The mobile terminal shown in FIG. 1 also communicates with a wired/wireless communication system and/or a satellite-based communication system, and may be configured to operate in a communication system transmitting data as frames or packets.

An exterior of the main body 100 will now be described in more detail with reference to FIGS. 2-4. In this description, the main body 100 is the main body of a bar-type mobile phone equipped with a full touch screen. However, the present invention is not restricted to a bar-type mobile phone. That is, the present invention can be applied to various mobile phones, other than a bar-type mobile phone, such as a folder-type mobile phone, a swing-type mobile phone and a slide-type mobile phone.

Figure 2:
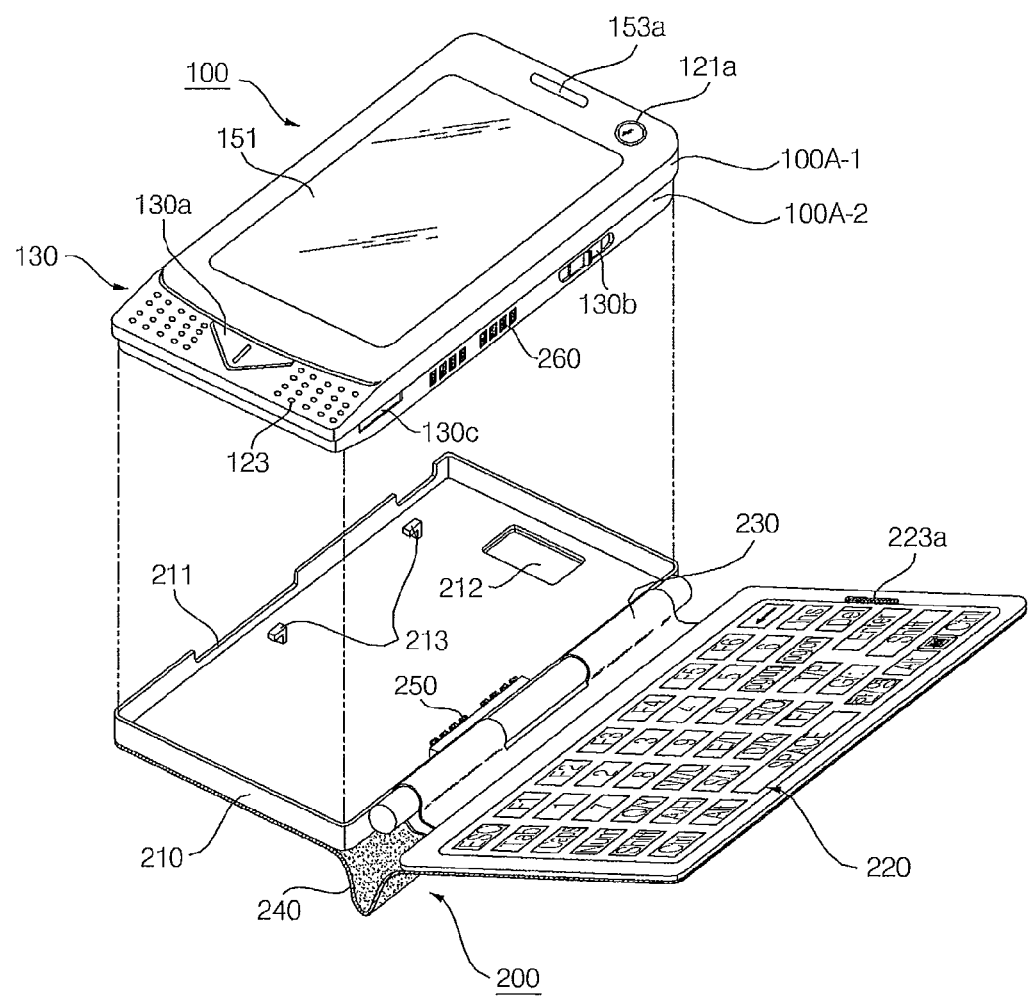
FIG. 2 is an exploded view illustrating the mobile terminal shown in FIG. 1.

First, FIG. 2 is an exploded perspective view illustrating the main body 100 and the expansion module 200. As shown, the main body 100 includes a first connector 260 exposed on one side of the main body 100, and the expansion module 200 includes a container 210 accommodating the main body 100 and a second connector 250 disposed on an inner sidewall of the container 210. The first and second connectors 260 and 250 are used to electrically connect the main body 100 and the expansion module 200 together and are placed in contact with each other when the main body 100 and the expansion module 200 are connected.

The mobile terminal 100 is also defined by a front case 100A-1 and a rear case 100A-2, and various electronic products are installed in the empty space between the front case 100A-1 and the rear case 100A-2. At least one intermediate case may also be disposed between the front case 100A-1 and the rear case 100A-2. In addition, the front case 100A-1 and the rear case 100A-2 may be formed of a synthetic resin through injection molding, or be formed of a metal such as stainless steel (STS) or titanium (Ti). FIG. 2 also illustrates the display module 151, a first audio output module 153a, a first camera 121a, a first user input unit 130a and the microphone 123 disposed in the front case 100A-1. A second user input unit 130b, a third user input unit 130c and the first connector 260 are also disposed on one side of the rear case 100A-2.

In addition, the display module 151 may be an LCD or an OLED which can visualize information. Further, because a touch pad is configured to overlap the display module 151 to realize a layered structure, the display module 151 also serves as a touch screen. Thus, it is possible for the user to input various information to the display module 151 simply by touching the display module 151. Further, the first audio output module 153a may be implemented as a receiver or a speaker, and the first camera 121a may be configured to capture a still image or a moving image of the user.

Also, the first through third user input units 130a through 130c and fourth and fifth user input units 130d and 130e (see FIG. 4) may be collectively referred to as the user input unit 130. The user input unit 130 can also adopt various manipulation methods and provide tactile feedback to the user. For example, the user input unit 130 may be implemented as a dome switch or a touch pad which receives a command or information upon being pushed or touched by the user. Alternatively, the user input unit 130 may be implemented as a wheel, a jog dial or a joystick. The first user input unit 130a may also allow the user to input such commands as 'start', 'end', and 'scroll', and the second through fifth user input units 130b through 130e may serve as hot keys for activating certain functions of the mobile terminal shown in FIG. 1. The microphone 123 may also be configured to receive the voice of the user or other sounds.

In addition, the first connector 260 may be an 8-pin connector with two rows of four pins, and be exposed on one side of the rear case 100A-2. Referring to FIG. 3, a connector 261 is provided on one side of a circuit board 101 installed in the front case 100A-1. The first connector 260 is also placed in contact with the connector 261 when the front case 100A-1 and the rear case 100A-2 are coupled. In this manner, it is possible to transmit electric signals between the circuit board 101 and the outside of the main body 100.

Referring to FIG. 2, the expansion module 200, which can be connected to or disconnected from the main body 100, includes the container 210, a cover 220 covering the main body 100 when the main body 100 is contained in the container 210, and a hinge 230 connecting the container 210 and the cover 220 so that the cover 220 can turn or rotate on the hinge 230. In addition, the container 210 includes a through hole 212 (FIG. 2) and the rear case 100A-2 includes a through hole 102 (FIG. 3) through which a second camera 121b, a camera flash 125 and a mirror 126 (FIG. 4) in the rear case 100A-2 can be exposed. As shown in FIG. 2, the cover 220 also includes a through hole 223a through which the first audio output module 153a in the front case 100A-1 can be exposed. In addition, the second connector 250 is disposed on a portion of the container 210 adjacent to the hinge 230, and can be connected to the first connector 260 of the main body 100. A pair of fixing hooks 213 are also formed on an inner sidewall of the container 210, and can be used to connect the expansion module 200 to or disconnect the expansion module 200 from the main body 100.

Figure 3:
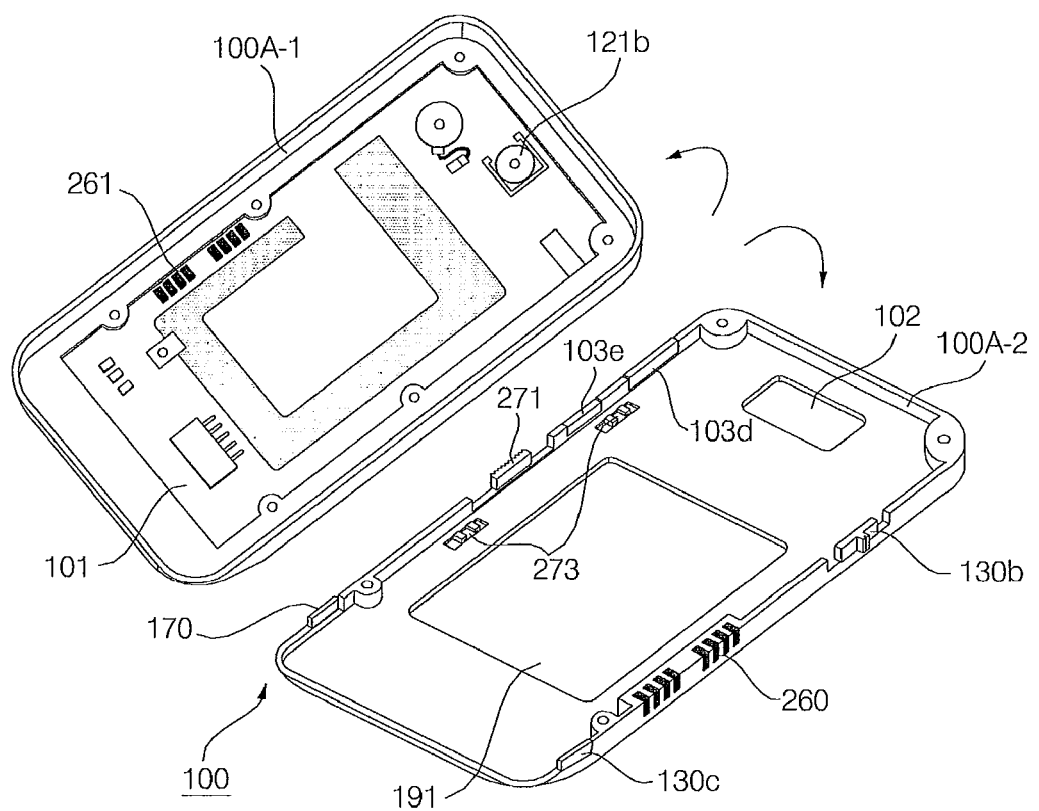
FIG. 3 is an exploded view illustrating a main body shown in FIG. 2.
Figure 4:
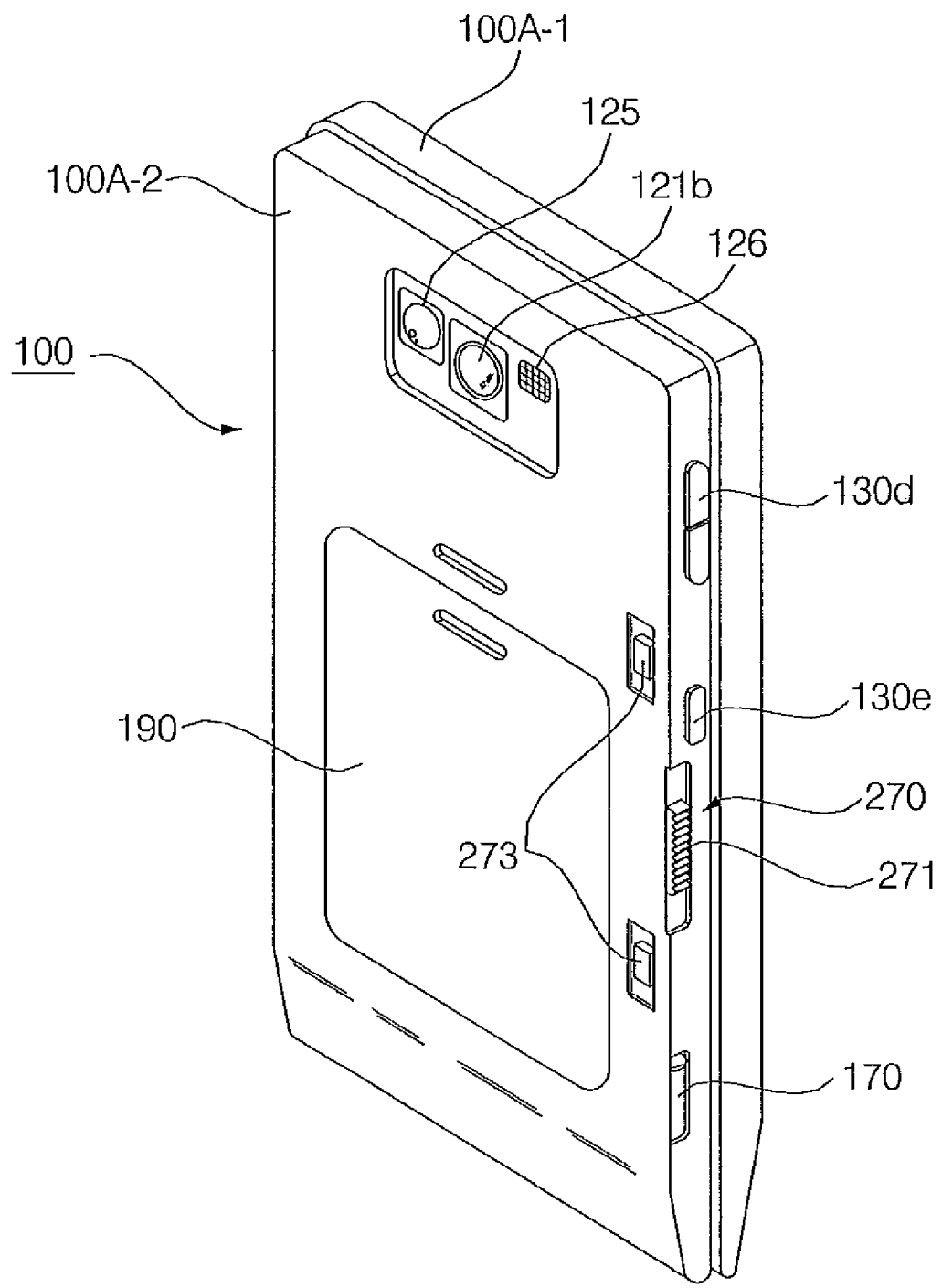
FIG. 4 is a rear perspective view illustrating the main body shown in FIG. 2.

Referring to FIGS. 3 and 4, a pair of holders 273 is also formed on an outer sidewall of the rear case 100A-2 of the main body 100, and is configured to engage with the fixing hooks 213 shown in FIG. 2. As shown in FIGS. 2 and 4, one or more slits 211 can be formed on another side of the container 210, and the fourth and fifth user input units 130d and 130e, the interface unit 170 and/or a holder grip 271 can exposed through the slits 211. Further, springs may be provided in the rear case 100A-2 so that the holders 273 can return to their original position after being pressed into the main body 100. The fixing hooks 213 may also be engaged with or released from the holders 273 by flipping up or down the holder grip 271. In addition, external accessories such as a keypad, a touchpad, an exterior speaker, a gamepad, a display, a projector and a short-range wireless communication I/O device may also be provided on an inner surface of the cover 220. For example, referring to FIG. 2, an expansion input keypad may be disposed on the inner surface of the cover 220. Also, as shown in FIG. 2, an exterior cover 240 may be attached onto the exterior of the container 210 and the cover 220 for decoration purposes. The exterior cover 240 may be formed of genuine leather, synthetic leather, synthetic resin or a metallic material, for example.

In addition, as shown in FIG. 4, the fourth and fifth user input units 130d and 130e and the interface unit 170 are disposed on one side of the rear case 100A-2, and the second camera 121b is disposed at the rear of the rear case 100B-2.

The second camera 121b may also have a different photographing direction from that of the first camera 121a shown in FIG. 2. In addition, the number of pixels of the second camera 121b may be different from the number of pixels of the first camera 121a. For example, the first camera 121a may be used to capture an image of the face of the user and then transmit the captured image during a video call. Thus, a low-pixel camera may be used as the first camera 121a. The second camera 121b may be used to capture an image of an ordinary subject. Given that images captured by the second camera 121b generally do not need to be transmitted, a high-pixel camera may be used as the second camera 121b.

Further, the camera flash 125 and the mirror 126 are disposed near the second camera 121b in FIG. 4. The camera flash 125 can be used to illuminate a subject when the second camera 121b captures an image of the subject, and the user can look in the mirror 126 for taking a self shot. In addition, a second audio output module can be additionally provided in the rear case 100A-2, and be used to realize a stereo function along with the first audio output module 153a. The second audio output module may also be used during a speakerphone mode. Further, an antenna for receiving a broadcast signal may be disposed on one side of the rear case 100A-2 and be installed so as to be able to be retracted from the rear case 100A-2.

In addition, the second camera 121b is illustrated in FIG. 3 as being disposed in the rear case 100A-2, but the present invention is not restricted to this. In addition, the first camera 121a may be able to rotate and thus to cover the photographing direction of the second camera 121b. In this instance, the second camera 121b can be optional. Further, as shown in FIGS. 3 and 4, the power supply unit 190 is disposed in the rear case 100A-2 and is visible via a through-hole 191. The power supply unit 190 may be a rechargeable battery and be coupled to the rear case 100A-2 so as to be attachable to or detachable from the rear case 100A-2.

Figure 5:
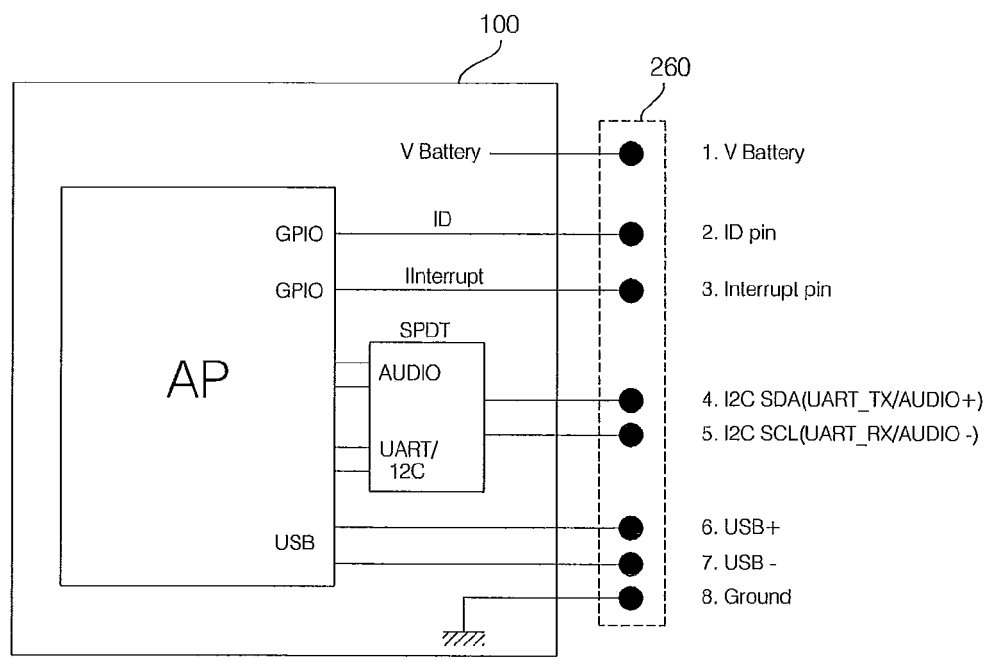
FIG. 5 is an overview illustrating a plurality of signals transmitted via a first connector of the main body shown in FIG. 2.

Next, FIG. 5 is a circuit diagram illustrating how a plurality of signals can be transmitted via the first connector 260 connecting the main body 100 and the expansion module 200. The same signals as those transmitted via the first connector 260 can also be transmitted via the second connector 250 of the expansion module 200. Referring to FIG. 5, a positive terminal (+) of a battery can be connected to a first pin of the first connector 260. If the expansion module 200 is not equipped with a battery, the expansion module 200 may be supplied with power through the first pin of the first connector 260 by the battery 190 of the mobile terminal shown in FIG. 1. On the other hand, if the expansion module 200 has its own battery, a signal indicating whether the expansion module 200 has its own battery can be transmitted via the first pin of the first connector 260.

In addition, a second pin of the first connector 260 can be used as an identifier (ID) pin, and thus the controller 180 can determine whether the expansion module 200 is connected to the main body 100 based on a signal input thereto via the second pin of the first connector 260. Further, if the expansion module 200 is connected to the main body 100, the controller 180 can obtain an ID of the expansion module 200 and various information regarding the expansion module 200 from a signal input thereto via the second pin of the first connector 260. Further, a third pin of the first connector 260 can be used as an interrupt pin. For example, if the main body 100 is placed in an ultra-power-save mode, a wake-up signal can be transmitted from the expansion module 200 to the main body 100 via the third pin of the first connector 260.

Further, fourth and fifth pins of the first connector 260 can be used for communication between the main body 100 and the expansion module 200. For example, during IC2 (or I²c) communication between the main body 100 and the expansion module 200, a serial data line (SDA) signal and a serial clock line (SCL) signal can be transmitted via the fourth and fifth pins of the first connector 260. During universal asynchronous receiver/transmitter (UART) communication, a transmitter (TX) signal and a receiver (RX) signal can be transmitted via the fourth and fifth pins of the first connector 260. Also, if the expansion module 200 is equipped with an exterior speaker, an audio signal can be output via the fourth and fifth pins of the first connector 260. Sixth and seventh pins of the first connector 260 can also be used for universal serial bus (USB) communication between the main body 100 and the expansion module 200, and a ground source can be connected to an eighth pin of the first connector 260.

Figure 6:
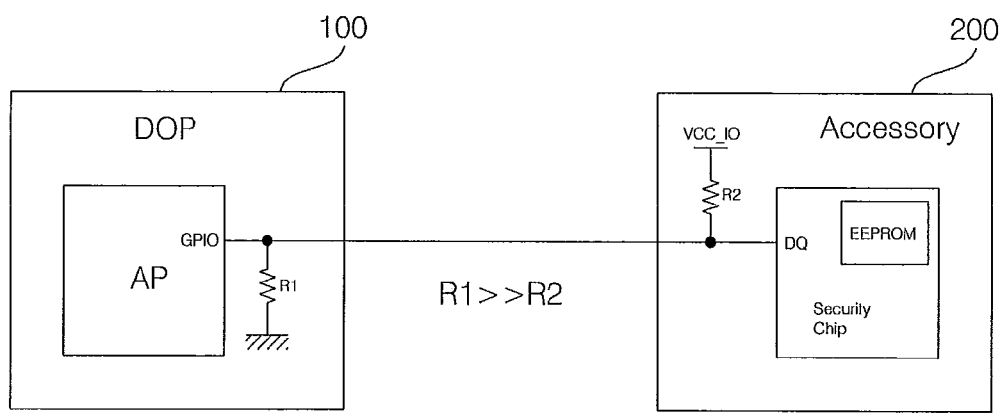
FIGS. 6 and 7 are overviews illustrating interactions between the main body and the expansion module shown in FIG. 2.
Figure 7:
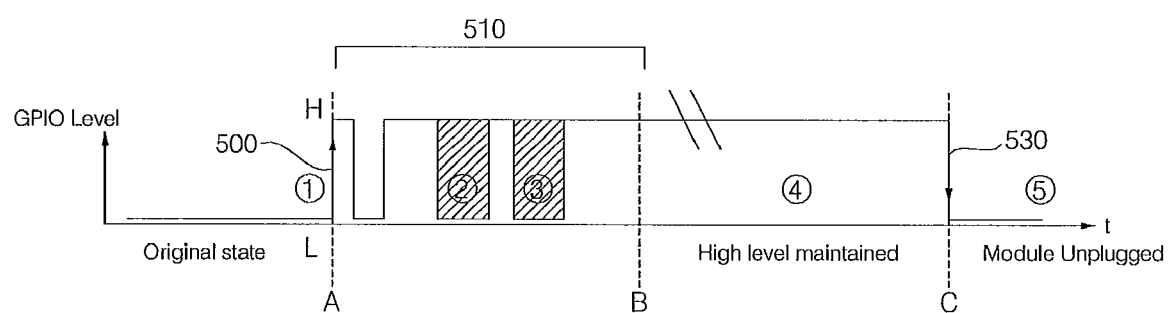

Next, FIGS. 6 and 7 are diagrams illustrating interactions between the main body 100 and the expansion module 200. In more detail, when the main body 100 is connected to the expansion module 200, the ID pin of the first connector 260 is connected to the expansion module 200 as shown in FIG. 6. In this instance, the level of a GPIO terminal of the main body 100 is raised by a resistor R2 of the expansion module 200 and may thus vary from a low level to a high level (see reference numeral 500 in FIG. 7). Then, referring to FIG. 7, the main body 100 can recognize that the expansion module 200 is connected thereto (①). Thereafter, the mobile terminal can set up 1-wire communication and examine the ID of the expansion module 200 (②). In addition, 1-wire communication is a type of signaling used for bidirectional communication between the main body 100 and the expansion module. In more detail, 1-wire communication provides lower-speed data, signaling and power over a single signal using only two wires: one for ground and one for power and data. In order to stably perform the examination of the ID of the expansion module 200, the expansion module 200 may use an interrupt mask for the ID pin of the first connector 260 during a time period D.

Once the expansion module 200 is successfully authenticated, the main body 100 can read data from the expansion module 200 and thus identify the type of the expansion module 200 (③). Thus, as shown in FIG. 7, the initialization process can be performed in time period 510 extending between points A and B using the 1-wire communication method. Therefore, a simpler communication method is used during this period, which saves battery power and results in less communication failures. Repairs are also easily performed on the mobile terminal or expansion module because of the use of the simpler 1-wire communication method using a single signal line (and only two pins). This saves the user a considerable amount of money.

Thereafter, the main body 100 and the expansion module 200 can communicate with each other using a serial communication method and the pins 4 and 5 in FIG. 5. During the communication between the main body 100 and the expansion module 200, the ID pin of the first connector 260 can be maintained at a high level (④). When the expansion module 200 is disconnected from the main body 100, the level of the GPIO terminal of the main body 100 may be switched from a high level to a low level due to a pull-down resistor of the main body 100 as shown by the reference numeral 530 in FIG. 7. Accordingly, the main body 100 can recognize that the expansion module 200 is separated from the main body 100 (⑤). In this manner, the main body 100 and the expansion module 200 can communicate with each other, and the expansion module 200 can provide various additional functions to the main body 100.

Figure 8A:
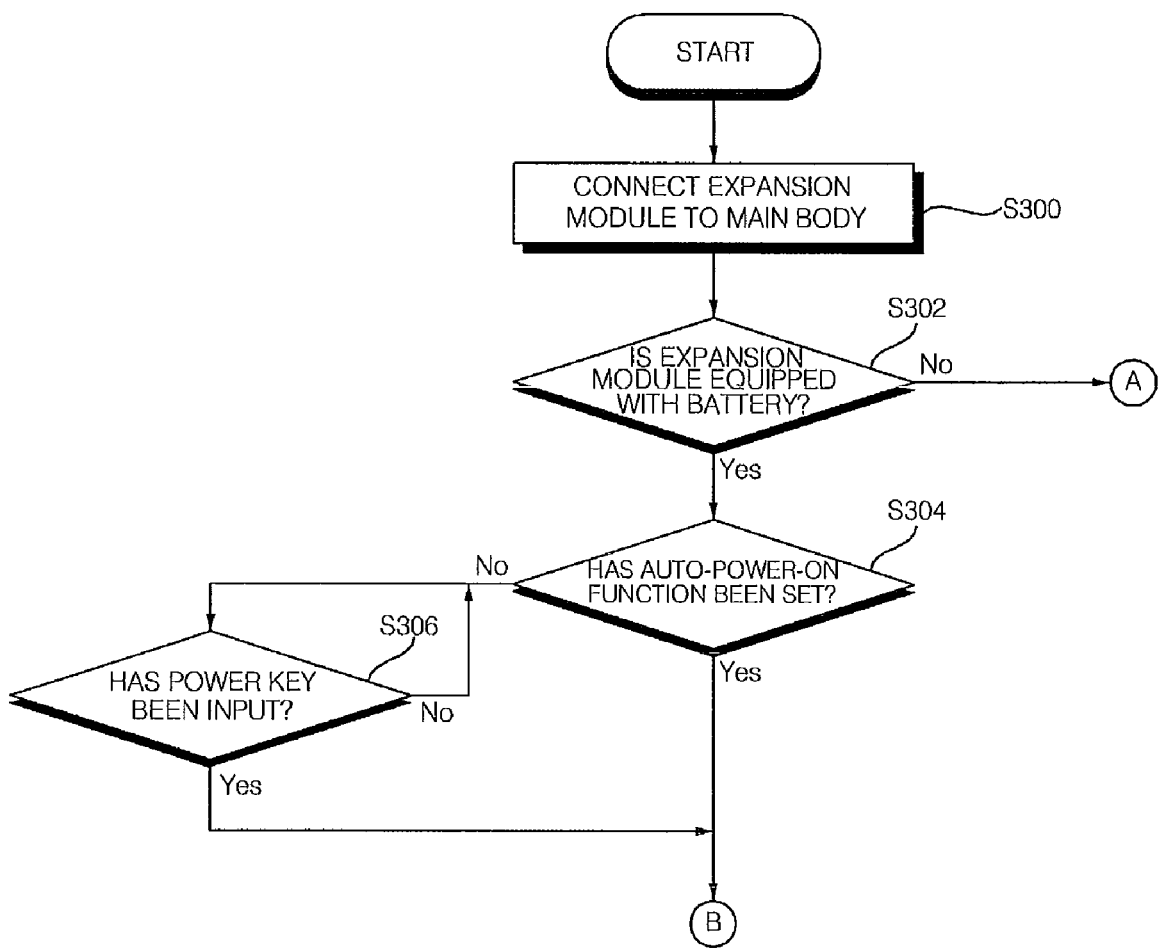
FIGS. 8A through 8C are flowcharts illustrating a method of controlling an operation of a mobile terminal according to an embodiment of the present invention.
Figure 8B:
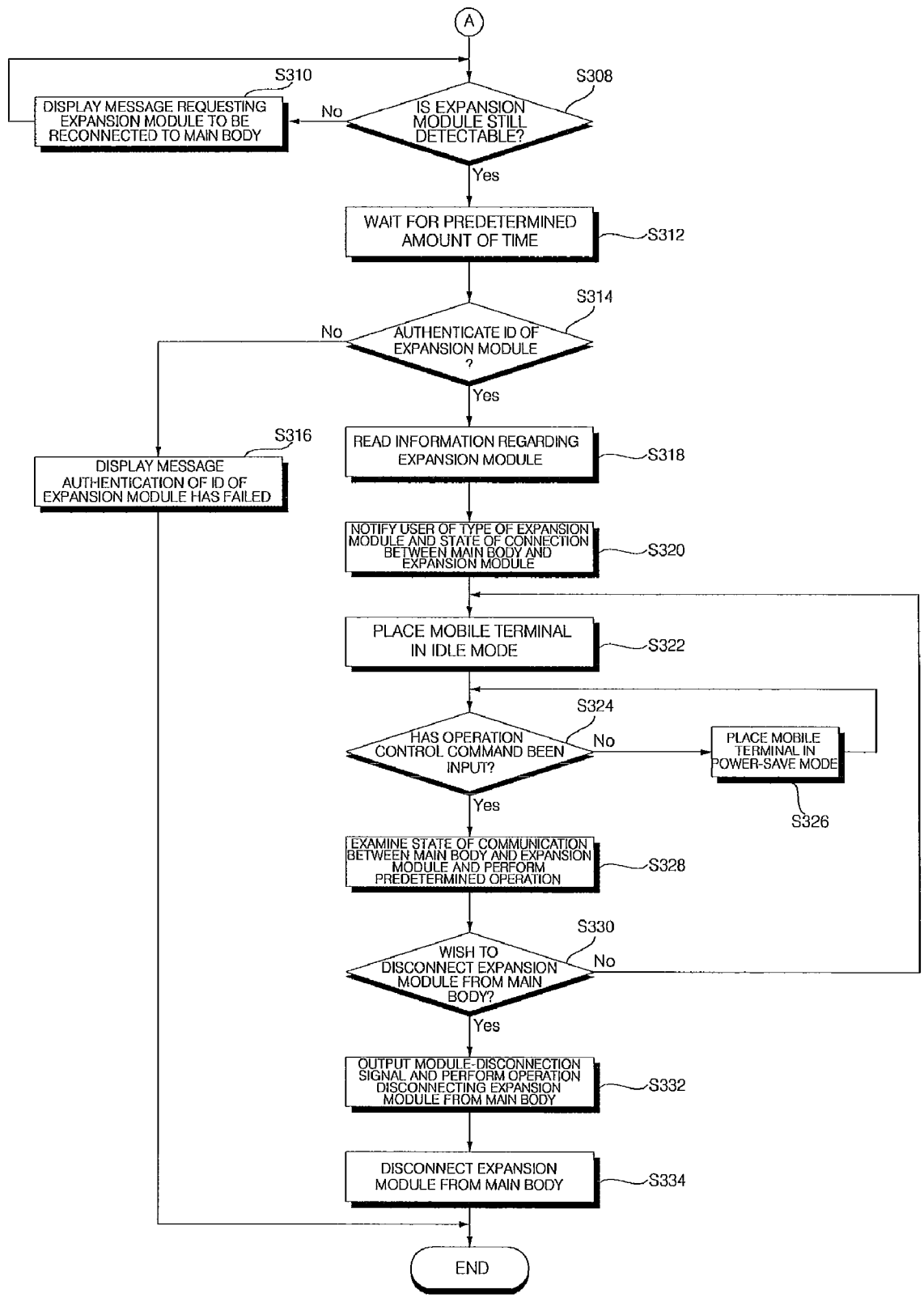
Figure 8C:
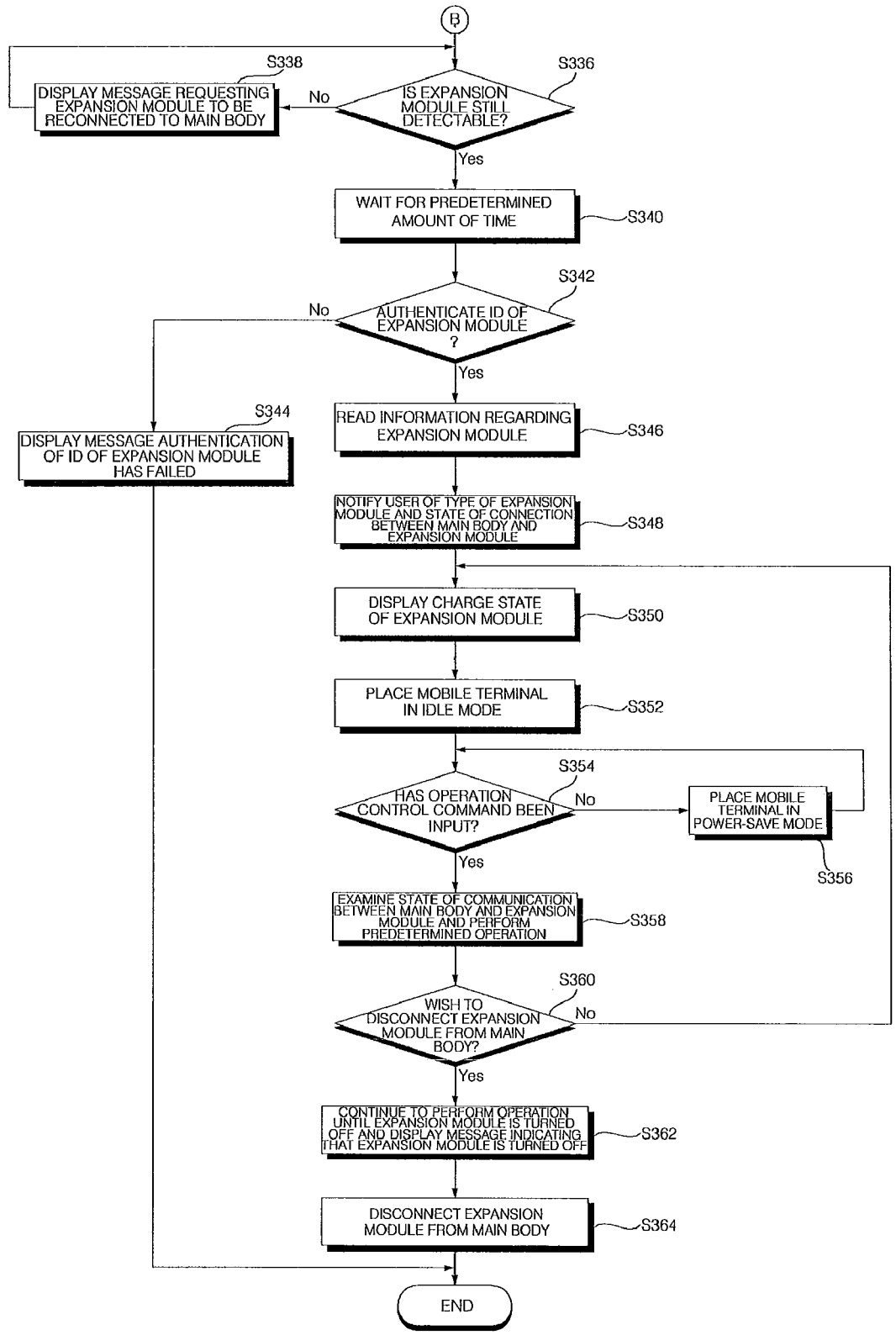

Next, FIGS. 8A through 8C are flowcharts illustrating a method of controlling the operation of a mobile terminal according to an embodiment of the present invention. FIGS. 1-7 will also be referred to throughout this description. As described above, the mobile terminal shown in FIG. 1 includes the main body 100 performing basic functions such as making or receiving a call and capturing an image and the expansion module 200 providing various additional functions to the main body 100. Thus, the expansion module 200 can be used as a tool for expanding the functions of the main body 100. The expansion module 200 can also be connected to the main body 100 via a contact-based method or a non-contact-based method.

Referring to FIG. 8A, when the main body 100 and the expansion module 200 are connected together (S300), the controller 180 determines whether the expansion module 200 has its own battery (S302). If the expansion module 200 is not equipped with a battery (No in S302), the method proceeds to operation S308 in FIG. 8B. If the expansion module 200 has its own battery (Yes in S302), the controller 180 determines whether an auto-power-on function has been set (S304). If the auto-power-on function has been set (Yes in S304), the method proceeds to operation S336 in FIG. 8C. If it is determined the auto-power-on function has not been set (No in S304), the controller 180 determines whether a power key has been input (S306). Further, the controller 180 can determine whether the expansion module 200 is equipped with its own battery based on a signal received from the expansion module 200 via, for example, the first pin of the first connector 260 or using a predetermined menu.

Referring to FIG. 8B, which corresponds to the expansion module 200 not including its own battery in S302 of FIG. 8A, the controller 180 determines whether the expansion module 200 can still be detected (S308). More specifically, the controller 180 determines whether the expansion module 200 can still be detected by determining whether a high-level signal has been input via the ID pin (second pin in FIG. 5) of the first connector 260. Further, the operation S308 is used for a situation in which the expansion module 200 is improperly connected to the main body 100 and is thus disconnected from the main body 100. If the controller 180 determines the expansion module 200 cannot be detected any longer (No in S308), the controller 180 display on the display module 151 a message requesting the expansion module 200 be connected again to the main body 100 (S310). That is, the expansion module 200 may only be slightly disconnected from the main body 100 of the mobile terminal. Thus, the message informs the user to secure the connection.

On the other hand, if the controller 180 determines the expansion module 200 can still be detected (Yes in S308), the controller 180 waits for a predetermined amount of time (S312) and then authenticates the ID of the expansion module 200 (S314). For example, the controller 180 can authenticate the ID of the expansion module 200 about one to two seconds after the expansion module 200 is connected to the main body 100 in order to prevent the occurrence of various communication errors that may have been caused when the main body 100 attempts to communicate with the expansion module 200 immediately after power is supplied thereto. This extra time gives the simpler and slower 1-wire communication method the appropriate time to send all signals.

Further, during the authentication of the ID of the expansion module 200, the controller 180 can determine whether the expansion module 200 is a legitimate product. In more detail, the expansion module 200 may include a security chip (see FIG. 6) storing an ID for authenticating the expansion module 200. Thus, the controller 180 can authenticate the expansion module 200 by reading the ID present in the security chip of the expansion module 200. If the authentication of the ID of the expansion module 200 fails (No in S314), the controller 180 can display a message indicating the failure of the authentication of the ID of the expansion module 200 on the display module 151 (S316), and the method ends. In this instance, the controller 180 may also display a message recommending the use of a legitimate expansion module on the display module 151. The controller 180 can also authenticate the ID of the expansion module 200 by performing the 1-wire communication with the expansion module 200 with the use of the ID pin of the first connector 260.

Once the ID of the expansion module 200 is successfully authenticated (Yes in S314), the controller 180 reads information regarding the expansion module 200 such as information specifying the type of the expansion module 200 from the expansion module 200 through the 1-wire communication (S318). Thereafter, the controller 180 notifies the user of the type of the expansion module 200 and the state of connection between the main body 100 and the expansion module 200 based on the read information (S320). In this manner, it is possible to notify the user of the state of the mobile terminal shown in FIG. 1. The user may also be notified of the type of the expansion module 200 and the state of connection between the main body 100 and the expansion module 200 in various manners, and the configuration of a UI may vary according to how to notify the user of the type of the expansion module 200 and the state of connection between the main body 100 and the expansion module 200.

Further, information indicating the state of connection between the main body 100 and the expansion module 200 may be displayed in various manners. For example, a popup window or an icon may be displayed on the display module 151 whenever the expansion module 200 is connected to or disconnected from the main body 100. Alternatively, an optical signal or an alarm signal may be output whenever the expansion module 200 is connected to or disconnected from the main body 100.

Thereafter, the controller 180 places the mobile terminal shown in FIG. 1 in an idle mode (S322). The controller 180 then determines if an operation command has been input (S324). If no command has been input (No in S324), the controller 180 places the mobile terminal in a power-saving mode (S326). If a command has been input (Yes in S324), the controller 180 performs an operation corresponding to an input operation control command (S328). If the input operation control command is a command associated with the expansion module 200, the controller 180 examines the state of communication between the main body 100 and the expansion module 200 and then performs the operation corresponding to the input operation control command. In this manner, it is possible to prevent the occurrence of various communication errors that may have been caused when the main body 100 keeps attempting to communicate with the expansion module 200 while not knowing that the expansion module 200 is disconnected from the main body 100. The controller 180 can also examine the state of communication between the main body 100 and the expansion module 200 by determining whether a high-level signal is being received via the ID pin of the first connector 260. If the results of the examination indicate that the expansion module 200 is disconnected from the main body 100, the controller 180 can display a message indicating that the expansion module 200 is not connected to the main body 100 any longer and place the mobile terminal shown in FIG. 1 back in the idle mode.

Further, if the user chooses to disconnect the expansion module 200 from the main body (Yes in S330), the controller 180 outputs a module-disconnection signal and performs an operation for disconnecting the expansion module 200 from the main body 100 (S332). The module-disconnection signal may be output in order to complete the transmission of data, if any, between the main body 100 and the expansion module 200 before the disconnection of the expansion module 200 from the main body 100 and thus to prevent any damage to the main body 100 or the expansion module 200. Thereafter, the controller 180 can display a message indicating that the expansion module 200 is allowed to be disconnected from the main body 100 on the display module 151, and the expansion module 200 can be disconnected from the main body 100 (S334).

Operations S336-S348 of FIG. 8C are the same as operations S308-S320, respectively, of FIG. 8B. Therefore, a description of operation S336-S348 will not be repeated. Referring to FIG. 8C, if the expansion module 200 has its own battery and the auto-power on function has been set in FIG. 8A, the controller 180 displays information regarding the charge state of the battery of the expansion module 200 (S350). More specifically, if the expansion module 200 has its own display device, the controller 180 can display information regarding the charge state of the battery of the expansion module 200 on the display device of the expansion module 200. On the other hand, if the expansion module 200 is not equipped with a display device, the controller 180 can display information regarding the charge state of the battery of the expansion module 200 on the display module 151.

Thereafter, the controller 180 places the mobile terminal shown in FIG. 1 in the idle mode (S352) operation, S354-S364 are the same as operation S324-S334 in FIG. 8B, and thus a description of these operations will not be repeated. Further, in order to charge the main body 100 and the expansion module 200, a charge port such as a USB port or an 18-pin MMI socket can be provided to each of the main body 100 and the expansion module 200. When the main body 100 and the expansion module 200 are connected, the charge ports of the main body 100 and the expansion module 200 may be connected. Thus, the main body 100 and the expansion module 200 may both be charged simply by charging only one of the main body 100 and the expansion module 200. Alternatively, the main body 100 and the expansion module 200 may be charged separately without any interference.

Also, in the exemplary embodiment shown in FIGS. 8A-8C, the main body 100 and the expansion module 200 are connected by being physically placed in contact with each other via a connector. However, the exemplary embodiment of FIGS. 8A through 8C can also be applied to when the main body 100 and the expansion module 200 are connected wirelessly in a non-contact-based manner. The mobile terminal and corresponding control method according to embodiments of the present invention are not restricted to the embodiments set forth herein. Therefore, variations and combinations of the embodiments set forth herein fall within the scope of the present invention.

Further, the embodiments of the present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and data transmission through the internet). Functional programs, code, and code segments needed for realizing the present invention can be easily construed by one of ordinary skill in the art.

As described above, according to embodiments of the present invention, it is possible to provide an expansion module capable of providing various additional functions to a mobile terminal by being connected to the mobile terminal. Thus, it is possible to provide a variety of additional functions to a mobile terminal simply by using various expansion modules without the need to increase the size of a mobile terminal. Therefore, there is no need to replace an existing mobile terminal with a new mobile terminal in order to be provided with various additional functions. Accordingly, it is possible to minimize the waste of resources. Further, there is no restriction or difficulty in providing a variety of additional functions and changing the functions of mobile terminals after the manufacture of the mobile terminals.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
a main body configured to provide a communication function;
an expansion module configured to provide a number of additional functions to the main body;
a connector including at least first, second and third pins and configured to electrically connect the main body and the expansion module together; and
a controller configured to determine whether a signal having a first logic level is received via the first pin of the connector, to set up communication between the mobile terminal and the expansion module using only the first pin and a corresponding ground source and a 1-wire communication method on the first pin if the signal received on the first pin has the first logic level, to determine whether or not the expansion module is an authenticated expansion module through the 1-wire communication method on the first pin, and to allow the expansion module to provide the number of additional functions to the main body through serial communication using the second and third pins when the expansion module is determined to be successfully authenticated.

2. The mobile terminal of claim 1, wherein the controller is further configured to maintain the signal received on the first pint to have the first logic level while the expansion module communicates with the main body using the serial communication on the second and third pins.

3. The mobile terminal of claim 1, wherein the connector includes a first connector disposed on the main body and a second connector disposed on the expansion module such when the main body and the expansion module are connected together, the main body and the expansion module communicate with each other via the first, second and third pins.

4. The mobile terminal of claim 1, wherein the first pin is a general purpose input/output (GPIO) pin to be connected with a security card of the expansion module and is used to obtain an identification of the expansion module.

5. The mobile terminal of claim 4, wherein the second and third pins are serial data communication pins used to serial communicate between the main body and the expansion module using a I2C serial communication method.

6. The mobile terminal of claim 1, further comprising:
a display module configured to display state connection information about the connection of the main body and the expansion module.

7. The mobile terminal of claim 1, wherein when at least one of the expansion module and the main body is in an audio output mode, a corresponding audio signal is transmitted via the second and third pins.

8. The mobile terminal of claim 1, wherein the connector further comprises a fourth pin, and the controller is further configured to perform a wakeup operation for waking up the mobile terminal during a power-saving mode upon receiving a wakeup signal on the fourth pin during the power-saving mode.

9. The mobile terminal of claim 8, wherein the connector further comprises fifth and sixth pins, and the controller is further configured to perform universal serial bus (USB) communication between the main body and the expansion module using the fifth and sixth pins.

10. The mobile terminal of claim 9, wherein the connector further comprises a seventh pin to which the ground source is connected and an eighth pin which is used as a power source terminal.

11. A method of controlling a mobile terminal including a main body configured to provide a communication function, an expansion module configured to provide a number of additional functions to the main body, and a connector including at least first, second and third pins and configured to electrically connect the main body and the expansion module together, the method comprising:
determining whether a signal having a first logic level is received via the first pin of the connector;
setting up communication between the mobile terminal and the expansion module using only the first pin and a corresponding ground source and a 1-wire communication method on the first pin if the signal received on the first pin has the first logic level;
determining whether or not the expansion module is an authenticated expansion module through the 1-wire communication method on the first pin; and
allowing the expansion module to provide the number of additional functions to the main body through serial communication using the second and third pins when the expansion module is determined to be successfully authenticated.

12. The method of claim 11, further comprising:
maintaining the signal received on the first pint to have the first logic level while the expansion module communicates with the main body using the serial communication on the second and third pins.

13. The method of claim 11, wherein the connector includes a first connector disposed on the main body and a second connector disposed on the expansion module such when the main body and the expansion module are connected together, the main body and the expansion module communicate with each other via the first, second and third pins.

14. The method of claim 11, wherein the first pin is a general purpose input/output (GPIO) pin connected with a security card of the expansion module and is used to obtain an identification of the expansion module.

15. The method of claim 14, wherein the second and third pins are serial data communication pins used to serial communicate between the main body and the expansion module using a I2C serial communication method.

16. The method of claim 11, further comprising:
displaying state connection information about the connection of the main body and the expansion module.

17. The method of claim 11, wherein when at least one of the expansion module and the main body is in an audio output mode, the method further comprises transmitting a corresponding audio signal via the second and third pins.

18. The method of claim 11, wherein the connector further comprises a fourth pin, and the method further comprises performing a wakeup operation for waking up the mobile terminal during a power-saving mode upon receiving a wakeup signal on the fourth pin during the power-saving mode.

19. The method of claim 18, wherein the connector further comprises fifth and sixth pins, and the method further comprises performing universal serial bus (USB) communication between the main body and the expansion module using the fifth and sixth pins.

20. The method of claim 19, wherein the connector further comprises a seventh pin to which the ground source is connected and an eighth pin which is used as a power source terminal.

* * * * *